US010666817B2

(12) United States Patent
Kakutani

(10) Patent No.: US 10,666,817 B2
(45) Date of Patent: May 26, 2020

(54) INFORMATION PROCESSING APPARATUS, INFORMATION TERMINAL, METHOD OF CONTROLLING THE SAME, PRINT SYSTEM, AND STORAGE MEDIUM THAT PROVIDE A FEATURE OF NOT SHOWING AN OPERATION SCREEN WHEN ANOTHER USER IS LOGGED IN

(71) Applicant: CANON KABUSHIKI KAISHA, Tokyo (JP)

(72) Inventor: Naoya Kakutani, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/751,503

(22) PCT Filed: Sep. 16, 2016

(86) PCT No.: PCT/JP2016/004254
§ 371 (c)(1),
(2) Date: Feb. 9, 2018

(87) PCT Pub. No.: WO2017/073008
PCT Pub. Date: May 4, 2017

(65) Prior Publication Data
US 2018/0234561 A1    Aug. 16, 2018

(30) Foreign Application Priority Data
Oct. 29, 2015  (JP) .................................. 2015-213325

(51) Int. Cl.
*H04N 21/4227*       (2011.01)
*H04N 1/00*          (2006.01)
(Continued)

(52) U.S. Cl.
CPC ....... *H04N 1/00408* (2013.01); *G06F 3/1203* (2013.01); *G06F 3/1222* (2013.01);
(Continued)

(58) Field of Classification Search
CPC ............ H04N 1/00973; H04N 1/00233; G06F 3/1238; G06F 3/1239
(Continued)

(56) References Cited

U.S. PATENT DOCUMENTS

2005/0265744 A1    12/2005  Uruta
2012/0262749 A1*   10/2012  Yamamoto ......... H04N 1/00244
                                                  358/1.14
(Continued)

FOREIGN PATENT DOCUMENTS

JP    2012064030 A    3/2012
JP    2013183215 A    9/2013

OTHER PUBLICATIONS

International Search Report issued in Intl. Appln. No. PCT/JP2016/004254 dated Nov. 29, 2016.
(Continued)

*Primary Examiner* — Jamares Q Washington
(74) *Attorney, Agent, or Firm* — Rossi, Kimms & McDowell LLP

(57) ABSTRACT

Provided is an information processing apparatus and a control method thereof. The apparatus includes a user interface unit that accepts an operation made by a user and a wireless communication unit that communicates wirelessly with an information terminal. A user authentication is executed in response to a user authentication request from the information terminal via the wireless communication unit. In the event of the authentication succeeding, a screen displayed by the user interface unit is not switched in the case where there is a logged-in user who has been authen-
(Continued)

ticated through the user interface unit in response to the user authentication request, whereas the screen displayed by the user interface unit is switched in the case where there is no such logged-in user.

12 Claims, 7 Drawing Sheets

(51) Int. Cl.
      *G06F 3/12*       (2006.01)
      *H04N 1/44*       (2006.01)

(52) U.S. Cl.
      CPC .......... *G06F 3/1236* (2013.01); *G06F 3/1238* (2013.01); *G06F 3/1292* (2013.01); *H04N 1/4426* (2013.01); *H04N 2201/0094* (2013.01)

(58) Field of Classification Search
      USPC .................... 358/1.15, 1.13; 399/81; 715/740
      See application file for complete search history.

(56) References Cited

U.S. PATENT DOCUMENTS

2013/0222840 A1*   8/2013   Hosoda .............. H04N 1/00204
                                                               358/1.14
2015/0212780 A1    7/2015   Nanjo
2015/0264191 A1*   9/2015   Kawano .................. G06F 21/44
                                                               358/1.14

OTHER PUBLICATIONS

Written Opinion issued in Intl. Appln. No. PCT/JP2016/004254 dated Nov. 29, 2016.

Office Action issued in Japanese Appln. No. 2015-213325 dated Sep. 6, 2019.

* cited by examiner

[Fig. 1]
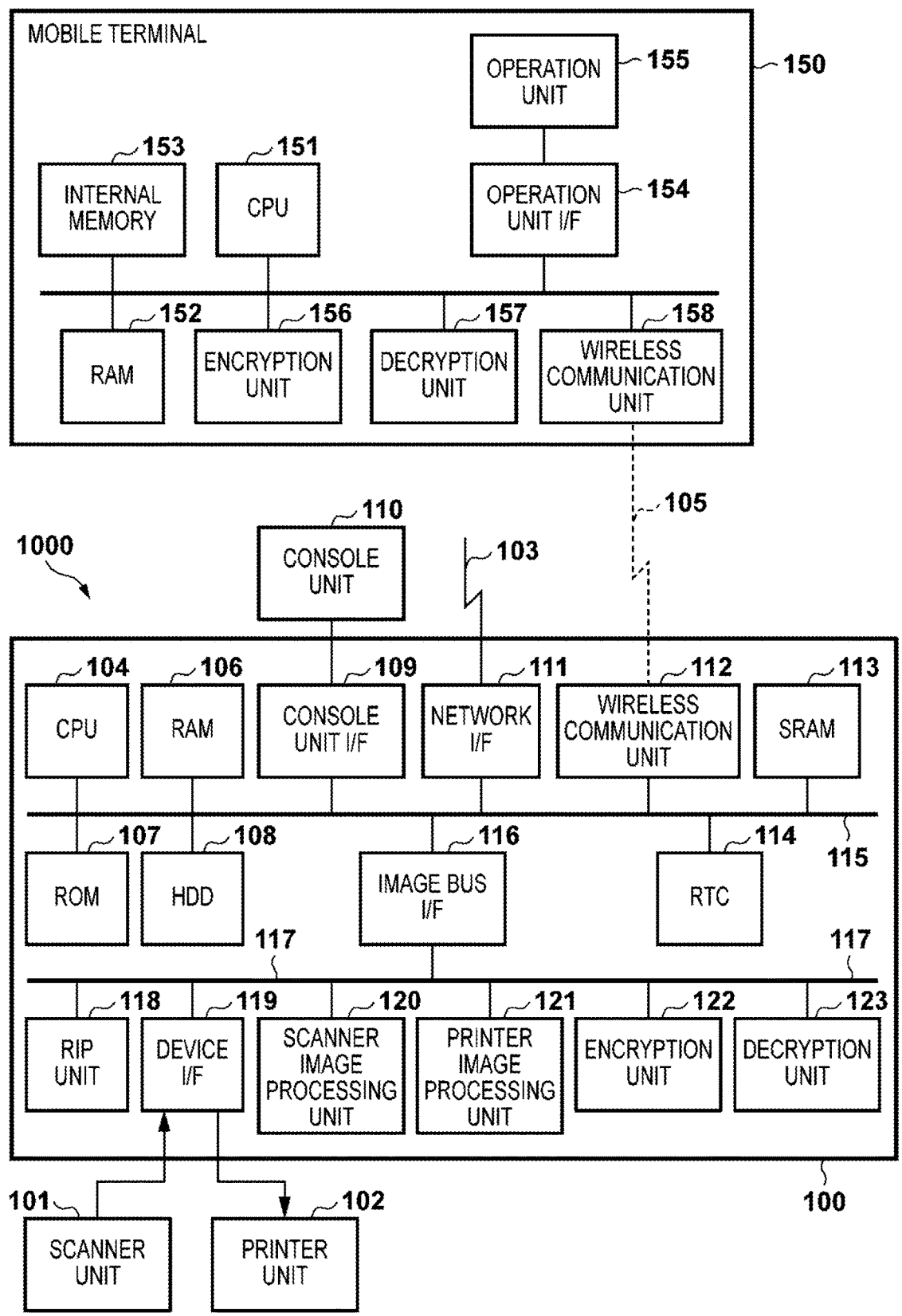

[Fig. 2]
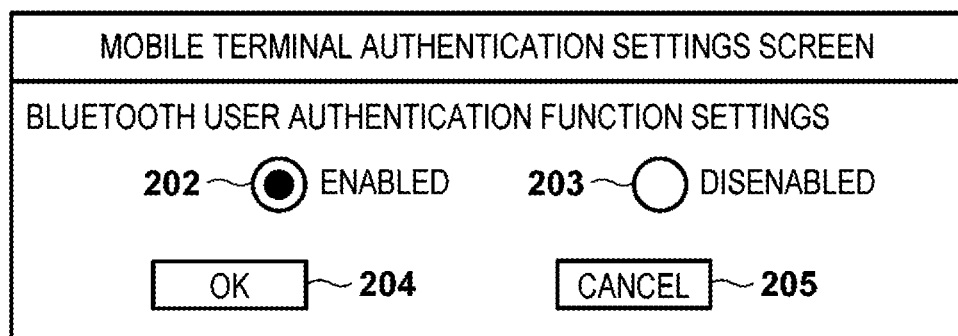

[Fig. 3]
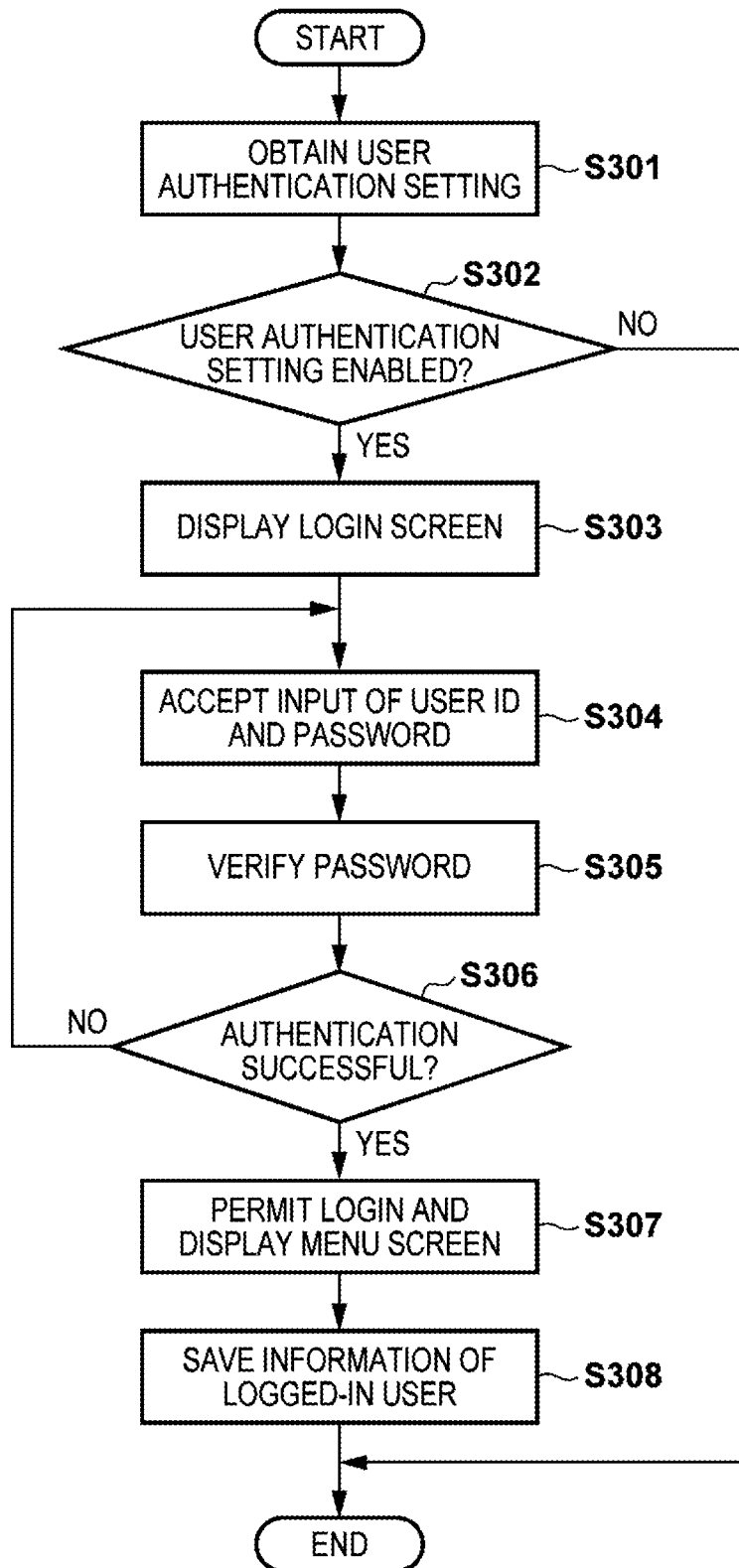

[Fig. 4A]
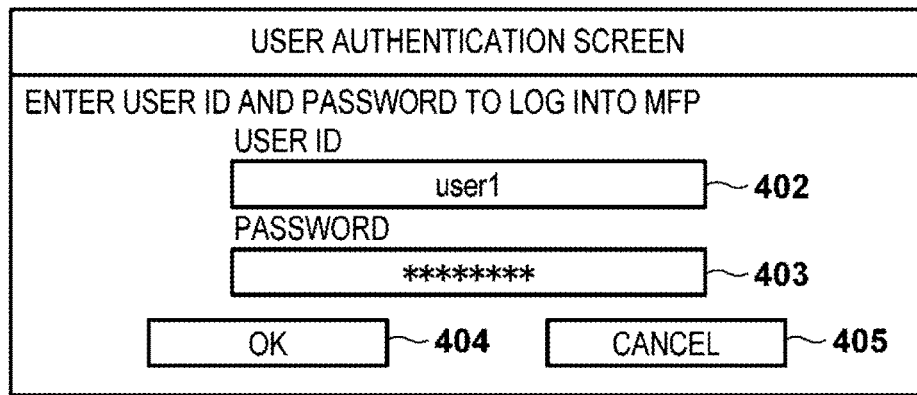
[Fig. 4B]
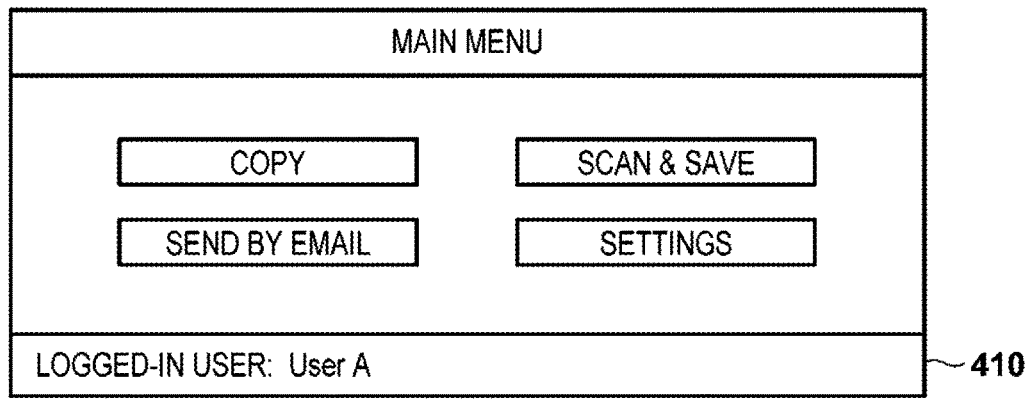
[Fig. 4C]
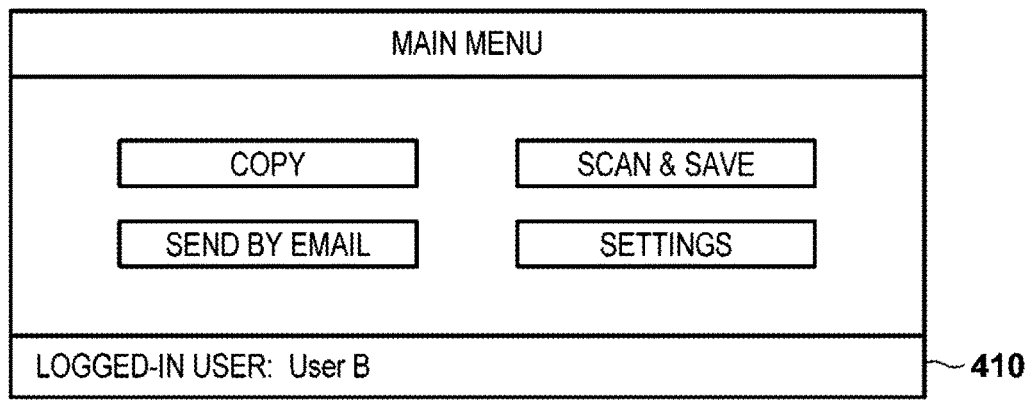

[Fig. 5]
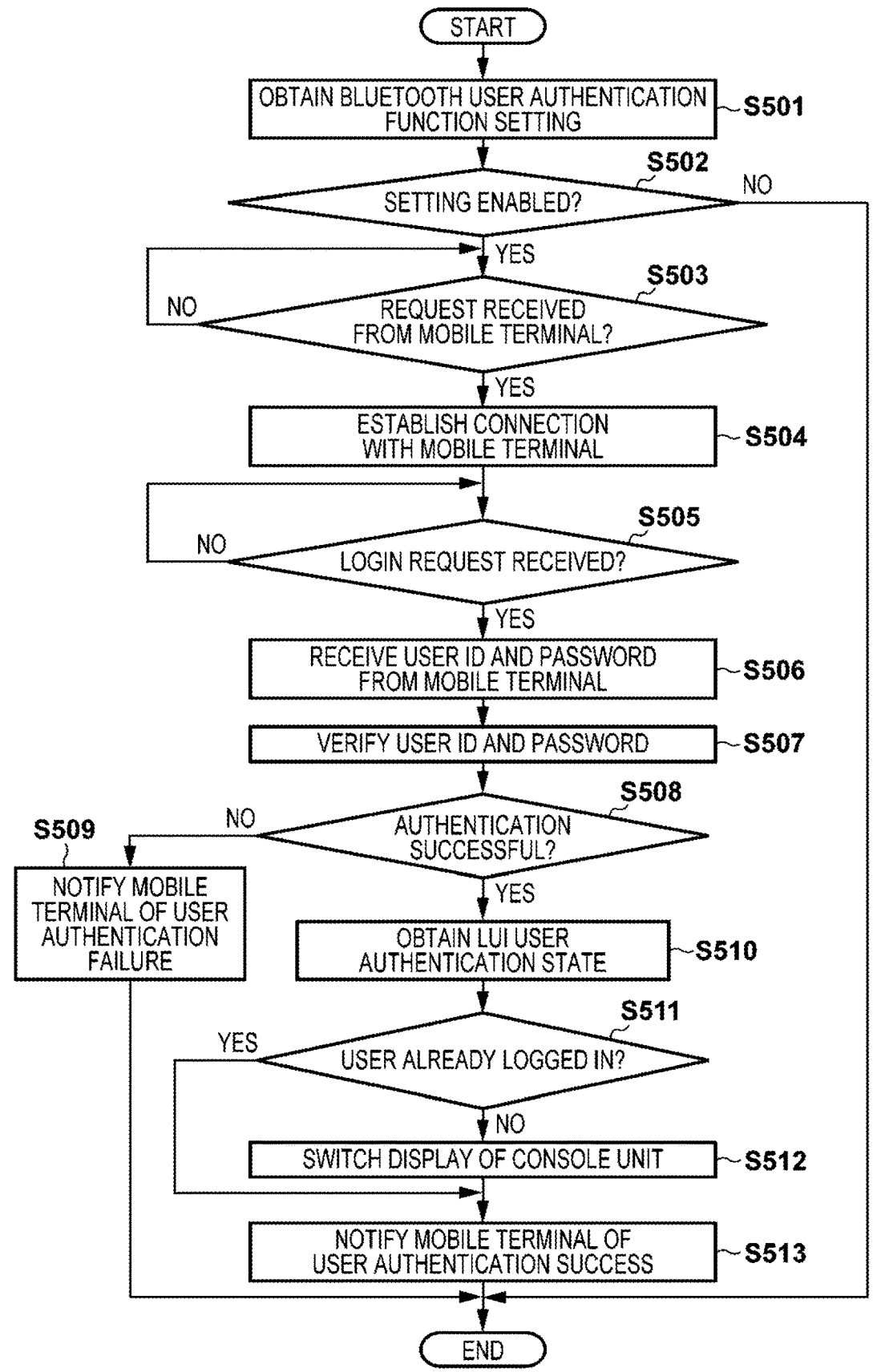

[Fig. 6A]

```
           USER AUTHENTICATION SCREEN
┌────────────────────────────────────────────┐
│ ENTER USER ID AND PASSWORD TO LOG INTO MFP │
│   USER ID                                  │
│   ┌──────────────────────┐                 │
│   │       User B         │ ~602            │
│   └──────────────────────┘                 │
│   PASSWORD                                 │
│   ┌──────────────────────┐                 │
│   │      ********        │ ~603            │
│   └──────────────────────┘                 │
│      ┌─────┐                 ┌────────┐    │
│      │ OK  │ ~604            │ CANCEL │    │
│      └─────┘                 └────────┘    │
└────────────────────────────────────────────┘
```

[Fig. 6B]

```
                MENU SCREEN
┌────────────────────────────────────────────┐
│ CONNECTED TO MFP                           │
│ SELECT THE FUNCTION YOU WISH TO USE        │
│                                            │
│        ┌──────────────────────────┐        │
│        │   MOBILE PRINT FUNCTION  │        │
│        └──────────────────────────┘        │
│                                            │
│        ┌──────────────────────────┐        │
│        │   SAVE IN MFP STORAGE    │        │
│        └──────────────────────────┘        │
└────────────────────────────────────────────┘
```

[Fig. 7]

```
                MOBILE TERMINAL
        USER AUTHENTICATION FUNCTION SETTING SCREEN
┌────────────────────────────────────────────┐
│ DEVICE SCREEN FORCIBLE SWITCH SETTING      │
│               ~702                         │
│         ● ENABLE                           │
│               ~703                         │
│         ○ DISENABLE                        │
│                                            │
│      ┌─────┐              ┌────────┐       │
│      │ OK  │ ~704         │ CANCEL │ ~705  │
│      └─────┘              └────────┘       │
└────────────────────────────────────────────┘
```

[Fig. 8]
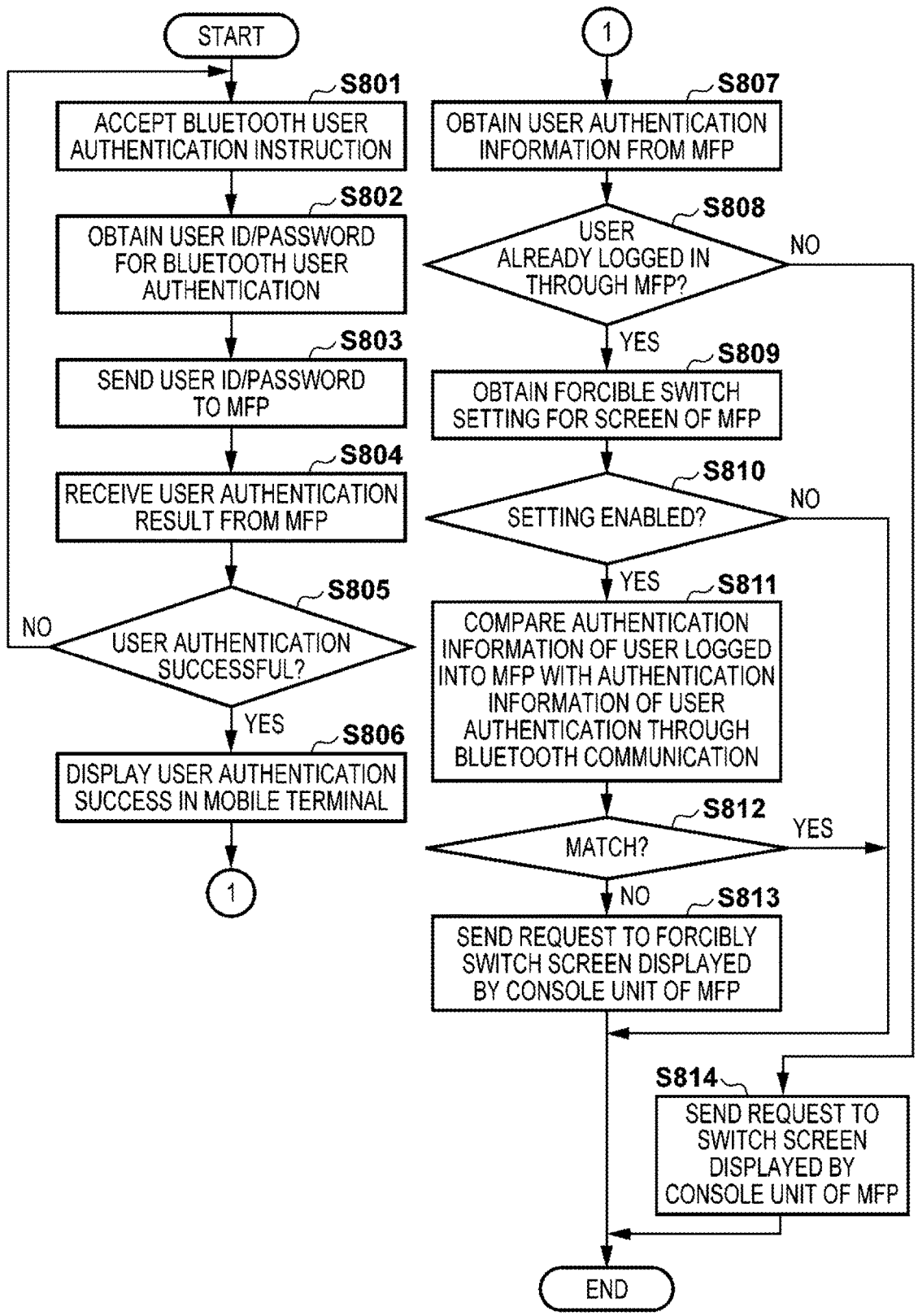

INFORMATION PROCESSING APPARATUS, INFORMATION TERMINAL, METHOD OF CONTROLLING THE SAME, PRINT SYSTEM, AND STORAGE MEDIUM THAT PROVIDE A FEATURE OF NOT SHOWING AN OPERATION SCREEN WHEN ANOTHER USER IS LOGGED IN

TECHNICAL FIELD

The present invention relates to an information processing apparatus, an information terminal, a method of controlling the same, a print system, and a storage medium.

BACKGROUND ART

Recently, multi-function peripherals, which are an example of an information processing apparatus including various wireless communication functions, are being provided with functions for pairing with mobile terminals, and multi-function peripherals that employ wireless LAN or Bluetooth (registered trademark), for example, as their wireless communication functions are known. For example, Japanese Patent Laid-Open No. 2012-64030 discloses a print system that, through short-range wireless communication between a mobile terminal and a printer over Bluetooth, can print a desired file using a wireless printer even in the case where that printer is not configured in a network system.

In addition to controlling printing through wireless communication over Bluetooth, a function for having a mobile terminal request a multi-function peripheral to authenticate a user through Bluetooth communication and then allowing the user to log into the multi-function peripheral if the authentication succeeds can be considered as a function provided by a multi-function peripheral. Such a user authentication function that uses Bluetooth communication is called a "Bluetooth user authentication function". When a user uses the mobile terminal and attempts to log into the multi-function peripheral using this Bluetooth user authentication function, a screen of the multi-function peripheral switches to a user authentication screen. In the event that the user authentication succeeds, the multi-function peripheral accepts print instructions and the like from the mobile terminal and executes processes such as printing.

Meanwhile, a multi-function peripheral normally can also authenticate users through a local user interface (local UI; LUI) such as a console or the like provided in the multi-function peripheral itself. A user authentication function that uses an LUI provided in the multi-function peripheral is called a "LUI user authentication function". The screen of the multi-function peripheral also switches to a user authentication screen when authenticating a user through LUI user authentication.

If a request for the Bluetooth user authentication function is made from a mobile terminal while a user is already logged into the multi-function peripheral through the LUI user authentication function, the screen of the multi-function peripheral will switch to the user authentication screen. When such a situation arises, the screen being operated by the user who is already logged in will switch, which impedes the operations being made by the logged-in user. However, if operations made by a logged-in user are prioritized, other users will not be able to use a mobile terminal to carry out user authentication with the multi-function peripheral and use functions for printing or the like in the case where there is already a logged-in user.

SUMMARY OF INVENTION

An aspect of the present invention is to eliminate the above-mentioned problems with the conventional technology.

A feature of the present invention is to provide a technique for ensuring that, when a user is logged into an information processing apparatus, operations made by the logged-in user will not be impeded even in the event of an authentication request from an information terminal.

According to a first aspect of the present invention, there is provided an information processing apparatus comprising: user interface means for accepting an operation made by a user; wireless communication means for communicating wirelessly with an information terminal; authentication means for executing a user authentication; user authentication means for executing a user authentication using said authentication means in response to a user authentication request from the information terminal via said wireless communication means; and control means for, in the event of the authentication by said user authentication means succeeding, carrying out control so that a screen displayed by said user interface means is not switched in the case where there is a logged-in user who has been authenticated through said user interface means in response to the user authentication request, and so that the screen displayed by said user interface means is switched in the case where there is no such logged-in user.

According to a second aspect of the present invention, there is provided an information terminal comprising: user interface means for accepting an operation made by a user; wireless communication means for communicating wirelessly with an information processing apparatus; request means for, through said wireless communication means, requesting the information processing apparatus to authenticate a user in response to a user authentication request from said user interface means; setting means for setting whether or not to make a request to forcibly switch a screen displayed by the information processing apparatus; determination means for, in the case where the user authentication carried out by the information processing apparatus in response to the request from said request means has succeeded, determining whether or not there is a user logged into the information processing apparatus; and control means for, in the event of said determination means determining that there is no user logged into the information processing apparatus, carrying out control for requesting the screen displayed by the information processing apparatus to be switched, and in the event of said determination means determining that there is a user logged into the information processing apparatus, carrying out control for requesting the screen displayed by the information processing apparatus to be switched in the case where said setting means is set to make the request to forcibly switch the screen.

According to a third aspect of the present invention, there is provided a print system comprising a mobile terminal and an image forming apparatus, wherein the image forming apparatus comprises: first user interface means for accepting an operation made by a user; first wireless communication means for communicating wirelessly with the mobile terminal; authentication means for executing a user authentication; user authentication means for executing a user authentication using said authentication means in response to a user authentication request from the mobile terminal via said wireless communication means; and first control means for, in the event of the authentication by said user authentication means succeeding, carrying out control so that a screen displayed by said first user interface means is not switched in the case where there is a logged-in user who has been authenticated through said first user interface means in response to the user authentication request, and so that the screen displayed by said first user interface means is switched in the case where there is no such logged-in user, and wherein the mobile terminal comprises: second user interface means for accepting an operation made by a user; second wireless communication means for communicating wirelessly with the image forming apparatus; request means for, through said second wireless communication means, requesting the image forming apparatus to authenticate a user in response to a user authentication request from said second user interface means; setting means for setting whether or not to make a request to forcibly switch a screen displayed by said first user interface means of the image forming apparatus; determination means for, in the case where the user authentication carried out by the image forming apparatus in response to the request from said request means has succeeded, determining whether or not there is a user logged into the image forming apparatus; and second control means for, in the event of said determination means determining that there is no user logged into the image forming apparatus, carrying out control for requesting the screen displayed by said first user interface means of the image forming apparatus to be switched, and in the event of said determination means determining that there is a user logged into the image forming apparatus, carrying out control for requesting the screen displayed by said first user interface means of the image forming apparatus to be switched in the case where said setting means is set to make the request to forcibly switch the screen.

According to a fourth aspect of the present invention, there is provided a method of controlling an information processing apparatus including a user interface unit that accepts an operation made by a user and a wireless communication unit that communicates wirelessly with an information terminal, the method comprising: authenticating a user, executing user authentication in the step of authenticating a user in response to a user authentication request from the mobile terminal via the wireless communication unit; and carrying out control, in the event of the authentication in the step of executing user authentication succeeding, so that a screen displayed by the user interface unit is not switched in the case where there is a logged-in user who has been authenticated through the user interface unit in response to the user authentication request, and so that the screen displayed by the user interface unit is switched in the case where there is no such logged-in user.

According to a fifth aspect of the present invention, there is provided a method of controlling an information terminal including a user interface unit that accepts an operation made by a user and a wireless communication unit that communicates wirelessly with an information processing apparatus, the method comprising: requesting, through the wireless communication unit, the information processing apparatus to authenticate a user in response to a user authentication request from the user interface unit; setting whether or not to make a request to forcibly switch a screen displayed by the information processing apparatus; determining, in the case where the user authentication carried out by the information processing apparatus in response to the request in the step of requesting has succeeded, whether or not there is a user logged into the information processing apparatus; and carrying out control, in the event of it being determined in the step of determining that there is no user logged into the information processing apparatus, for requesting the screen displayed by the information processing apparatus to be switched, and in the event of it being determined in the step of determining that there is a user logged into the information processing apparatus, carrying out control for requesting the screen displayed by the information processing apparatus to be switched in the case where the setting made in the step of setting is a setting for making the request to forcibly switch the screen.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1 is a block diagram for describing the configuration of a print system including a multi-function peripheral and a mobile terminal according to a first embodiment of the present invention.

FIG. 2 depicts a view illustrating an example of a mobile terminal authentication setting screen displayed in a console unit of the multi-function peripheral according to the first embodiment.

FIG. 3 is a flowchart for describing a user authentication process carried out through the console unit by the multi-function peripheral according to the first embodiment.

FIG. 4A depicts a view illustrating an example of a login screen displayed on the console unit of the multi-function peripheral according to the first embodiment.

FIGS. 4B and 4C depict views illustrating examples of a main menu screen.

FIG. 5 is a flowchart for describing a process carried out upon the multi-function peripheral accepting user authentication from the mobile terminal using a Bluetooth communication function, according to the first embodiment.

FIGS. 6A and 6B depict views illustrating an example of a user authentication screen and a main menu screen displayed in a console unit of the mobile terminal according to the first embodiment.

FIG. 7 depicts a view illustrating an example of a user authentication function setting screen displayed in an operation unit by a mobile terminal according to a second embodiment of the present invention.

FIG. 8 is a flowchart for describing the flow of a process performed when the mobile terminal executes user authentication with a multi-function peripheral through Bluetooth communication, according to the second embodiment.

DESCRIPTION OF EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that the embodiments describe an image forming apparatus or an information processing apparatus according to the present invention using a multi-function peripheral (digital multi-function peripheral; MFP) having a function for communicating wirelessly with a mobile terminal as an example. However, because a PC, a server, a single-function peripheral (SFP), and the like also can generally communicate with a mobile terminal, the present invention is not limited to a multi-function peripheral.

First Embodiment

FIG. 1 is a block diagram for describing the configuration of a print system including a multi-function peripheral 1000 and a mobile terminal 150 according to the first embodiment of the present invention. In the first embodiment, the multi-function peripheral 1000 and the mobile terminal 150 can communicate over a wireless LAN or Bluetooth.

The configuration of the multi-function peripheral 1000 will be described first.

A control unit 100 is connected to a scanner unit 101 serving as an image input device, a printer unit 102 serving as an image output device, and the like. The control unit 100 is also connected to a network 103, a public line, or the like, and inputs/outputs image information, device information, and so on over the network 103, the public line, or the like. The control unit 100 can also communicate with the mobile terminal 150 over a wireless network 105. A CPU 104 is a processor that controls the multi-function peripheral 1000 as a whole. A RAM 106 provides a system work memory for operations of the CPU 104, and is also used as a memory for temporarily storing programs run by the CPU 104, image data, user information, passwords, and so on. A ROM 107 serves as a boot ROM and stores a boot program. An HDD 108 is a hard disk drive, and stores system software, OS (operating system), applications, and image data. Programs for causing the CPU 104 to execute the processes described in the flowcharts according to the embodiments, which will be described later, are also stored in the HDD 108. When the multi-function peripheral 1000 is turned on, the CPU 104 executes the boot program stored in the ROM 107 and deploys, in the RAM 106, a control program, the OS, and the like stored in the HDD 108. By executing those deployed programs, the CPU 104 can execute the processes of the multi-function peripheral 1000, which will be described later. However, a processor aside from the CPU 104 may execute the steps of the flowcharts described later, or the CPU 104 and another processor may operate together to execute the processes of the flowcharts described later.

A console unit interface 109 is an interface unit with a console unit 110 having a touch panel function, and outputs image data to be displayed on the console unit 110 to the console unit 110 and causes the data to be displayed in a display unit of the console unit 110. The console unit interface 109 also has a function of communicating information input by a user through the console unit 110 to the CPU 104. The console unit 110 also functions as the display unit, which serves as a user interface. A network interface 111 is connected to the network 103, and inputs/outputs information over the network 103. A wireless communication unit 112 is connected to the wireless network 105, and inputs/outputs information through wireless communication. Wireless communication with the mobile terminal 150 is carried out through the wireless communication unit 112. An SRAM 113 is a non-volatile recording medium capable of high-speed access. An RTC 114 is a real-time clock, and continuously counts the current time even when the control unit 100 is not turned on. The units described thus far are connected to the CPU 104 via a system bus 115.

An image bus interface 116 is a bus bridge that connects the system bus 115 to an image bus 117 for transferring image data at high speeds, and converts data structures between these buses. The image bus 117 is implemented through a PCI bus or IEEE 1394. The following devices are disposed along the image bus 117. A RIP unit 118 is a raster image processor, and expands PDL code into a bitmap image. A device I/F 119 connects the scanner unit 101, the printer unit 102, and so on to the control unit 100, and performs synchronous/asynchronous conversion on the image data. A scanner image processing unit 120 corrects, processes, and edits the image data input from the scanner unit 101. A printer image processing unit 121 performs correction, resolution conversion, and the like on the image data output to the printer unit 102, in accordance with the printer unit 102. An encryption unit 122 encrypts input data including the image data. A decryption unit 123 decrypts encrypted data.

The configuration of the mobile terminal (information terminal) 150 will be described next.

A CPU 151 is a processor that controls the mobile terminal 150 as a whole. A RAM 152 provides a system work memory for operations of the CPU 151, and is also used as a memory for temporarily storing user information, passwords, and so on. An internal memory 153 is used to store a boot program, system software, applications, image data, and the like. Programs for executing processes of the mobile terminal 150, indicated in the flowcharts according to the first embodiment and described later, are also stored in the internal memory 153. An encryption unit 156 encrypts input data, generates random numbers, and so on. A decryption unit 157 decrypts encrypted data. A mobile terminal operation unit interface 154 is an interface unit with an operation unit 155 of the mobile terminal, which has a touch panel. This operation unit interface 154 serves to output image data to be displayed on the operation unit 155 to the operation unit 155, and communicate information input by a user through the operation unit 155 to the CPU 151. The operation unit 155 also functions as a display unit, which serves as a user interface of the mobile terminal 150. A wireless communication unit 158 is connected to the wireless network 105, and inputs/outputs information over the wireless network 105. Wireless communication between the mobile terminal 150 and the multi-function peripheral 1000 is carried out through the wireless communication unit 158.

Note that the steps in the flowcharts describing processes performed by the mobile terminal 150 according to the first embodiment, which will be described later, are realized by the CPU 151 executing programs stored in the internal memory 153. However, a processor aside from the CPU 151 may execute the steps of those flowcharts, or the CPU 151 and another processor may operate together to execute the processes of those flowcharts.

FIG. 2 depicts a view illustrating an example of a mobile terminal authentication setting screen displayed on the console unit 110 of the multi-function peripheral 1000 according to the first embodiment.

This mobile terminal authentication setting screen is a screen for setting the above-described "Bluetooth user authentication function", which is a user authentication function executed through Bluetooth communication. The mobile terminal authentication setting screen includes an enable button 202 for enabling the Bluetooth user authentication function, a disenable button 203 for disenabling the Bluetooth user authentication function, an OK button 204, and a cancel button 205. When the enable button 202 is checked and the OK button 204 is touched, the multi-function peripheral 1000 accepts a wireless communication connection from the mobile terminal 150 over Bluetooth. On the other hand, when the disenable button 203 is checked and the OK button 204 is touched, the multi-function peripheral 1000 does not accept a wireless communication connection from the mobile terminal 150 over Bluetooth. The cancel button 205 is a button for canceling the settings in this screen and transiting to a different screen.

In the first embodiment, settings made through the authentication setting screen are input through the console unit 110, and the setting values are held in the SRAM 113. FIG. 2 illustrates a state where the enable button 202 for setting the Bluetooth user authentication function is checked. Note that the first embodiment assumes that only an administrator of the multi-function peripheral 1000 can make these settings.

Next, LUI user authentication, in which the multi-function peripheral 1000 according to the first embodiment authenticates a user through a local UI (local user interface; LUI) of the multi-function peripheral 1000, will be described.

FIG. 3 is a flowchart for describing a user authentication process carried out through the console unit 110 by the multi-function peripheral 1000 according to the first embodiment. Note that a program that executes this processing is stored in the HDD 108, and the program is deployed in the RAM 106 by the CPU 104 at the time of execution and then executed by the CPU 104 to implement the processing.

In step S301, the CPU 104 obtains information, held in the SRAM 113, indicating whether or not user authentication through the console unit 110 is set to be enabled. This setting is assumed to be made by the administrator of the multi-function peripheral 1000 and stored in the SRAM 113 in advance. The process then advances to step S302, where the CPU 104 determines, on the basis of the information, whether or not user authentication through the console unit 110 is enabled. The process ends in the case where user authentication through the console unit 110 is not enabled, or in other words, user authentication cannot be carried out through the console unit 110.

In the case where it is determined in step S302 that user authentication through the console unit 110 is enabled, the process advances to step S303, where the CPU 104 causes a login screen to be displayed on the console unit 110.

FIG. 4A depicts a view illustrating an example of a user authentication screen displayed on the console unit 110 in the case where user authentication through the console unit 110 is enabled.

This authentication screen (login screen) includes a user ID (user identification information) input area 402, a password input area 403, an OK button 404, and a cancel button 405.

When a user inputs his or her user ID and password through this login screen and presses the OK button 404, the user ID and password that have been input are held in the RAM 106 through the console unit interface 109. In the first embodiment, the RAM 106 is used to temporarily store the user ID and password, but these items may be stored in the HDD 108 or the like instead. There is no such limitation in the embodiments described later as well. Additionally, although the first embodiment assumes that the multi-function peripheral 1000 stores a password associated with managed user information in the HDD 108 for the purpose of user authentication, this too is merely an example, and the storage location is not limited to the HDD 108.

In step S304, when the OK button 404 is pressed, the CPU 104 accepts the user information (user ID) and password input through the login screen. The process then advances to step S305, where the CPU 104 obtains the password associated with the input user ID from the HDD 108, compares the password with the password input through the login screen, and verifies whether the password is correct. The process then advances to step S306, where the CPU 104 determines whether or not the user authentication has succeeded as a result of the verification; in the case where the user authentication fails, an error is displayed on the console unit 110 and the process returns to step S304, whereas in the case where the authentication succeeds, the process advances to step S307. In step S307, the CPU 104 permits the user to log in, and displays the main menu screen on the console unit 110.

FIG. 4B depicts a view illustrating an example of the main menu screen displayed on the console unit 110 after the user has been permitted to log in.

This main menu screen includes a display area 410 that displays a username of the logged-in user, and FIG. 4B illustrates a state where a user having the name "User A" is logged in. Note that in the first embodiment, if this main menu screen remains displayed for a set amount of time, the logged-in user is automatically logged out and the display on the console unit 110 returns to the screen illustrated in FIG. 4A.

FIG. 4C, meanwhile, depicts a view illustrating an example of the main menu screen displayed on the console unit 110 after a different user ("User B") has been permitted to log in.

The process then advances to step S308, where the CPU 104 holds authentication information of the logged-in user in the RAM 106 and then ends the process.

In this manner, when the user authentication through the console unit 110 is set to be enabled, a user can carry out user authentication through the console unit 110 of the multi-function peripheral 1000 and log into the multi-function peripheral 1000.

Processing performed by the multi-function peripheral 1000 according to the first embodiment in the case where the multi-function peripheral 1000 has first received a connection request from the mobile terminal 150 will be described next.

FIG. 5 is a flowchart for describing a process carried out upon the multi-function peripheral 1000 accepting user authentication from the mobile terminal 150 using the Bluetooth communication function, according to the first embodiment. Note that a program that executes this processing is stored in the HDD 108, and the program is deployed in the RAM 106 by the CPU 104 at the time of execution and then executed by the CPU 104 to implement the processing.

First, in step S501, the CPU 104 obtains, from the SRAM 113, information indicating whether or not the Bluetooth user authentication function set through the screen illustrated in FIG. 2 is set to be enabled. The process then advances to step S502, where on the basis of that information, the CPU 104 determines whether or not the Bluetooth user authentication function is set to be enabled. In the case where the function is determined to not be enabled, or in other words, to be disenabled, user authentication from the mobile terminal through Bluetooth communication will not be accepted, and thus the process ends.

On the other hand, the process advances to step S503 in the case where it is determined that the enable button 202 is checked in the screen illustrated in FIG. 2 and information indicating that the Bluetooth user authentication function is set to be enabled is stored in the SRAM 113. In step S503, the CPU 104 determines whether or not a connection request has been received from the mobile terminal 150 through Bluetooth communication. In the case where a connection request has been received, the process advances to step S504, where the CPU 104 establishes a wireless communication connection with the mobile terminal 150 for carrying out Bluetooth communication. The process then advances to step S505, where the CPU 104 determines whether or not a login request for performing user authentication has been accepted from the mobile terminal 150 through Bluetooth communication. The process of step S505 is repeated in the case where a login request is not accepted, but advances to step S506 upon it being determined that a login request has been accepted.

FIG. 6A depicts a view illustrating an example of a user authentication screen displayed on the operation unit 155 of the mobile terminal 150 upon a login request being sent from the mobile terminal 150 to the multi-function peripheral 1000.

The user who is using the mobile terminal 150 inputs his or her user ID and password in a user ID input area 602 and a password input area 603 through the operation unit 155. Upon the user then pressing an OK button 604, a login request for performing user authentication is sent from the mobile terminal 150 to the multi-function peripheral 1000 through Bluetooth communication.

The process then advances to step S506, where the CPU 104 receives the user ID and password input through the screen illustrated in FIG. 6A from the mobile terminal 150 through Bluetooth communication. In the first embodiment, the user ID and password received in step S506 are held in the RAM 106.

The process then advances to step S507, where the CPU 104 determines whether or not the combination of the user ID and password received from the mobile terminal 150 is registered in the HDD 108, or in other words, whether or not the user authentication has succeeded. In the case where it is determined that the user authentication has failed, the process advances to step S509, where the CPU 104 sends information indicating that the user authentication has failed to the mobile terminal 150 and then ends the process. On the other hand, in the case where the CPU 104 determines in step S508 that the user ID and password are correct, or in other words, that the user authentication has succeeded, the process advances to step S510, where the CPU 104 obtains the state of user authentication made through the console unit 110 of the multi-function peripheral 1000, which is saved in the RAM 106. The process then advances to step S511, where the CPU 104 determines whether or not there is a user currently logged in through user authentication made using the console unit 110. The process advances to step S513 in the case where there is already a user currently logged in through user authentication made using the console unit 110, and otherwise the process advances to step S512. In step S512, the CPU 104 switches the display in the console unit 110 to the post-user authentication menu screen. Here, it is assumed that the aforementioned main menu screen illustrated in FIG. 4B is displayed, for example. The process then advances to step S513, where the CPU 104 notifies the mobile terminal 150 that the user authentication has succeeded and then ends the process.

FIG. 6B depicts a view illustrating an example of an operating screen displayed in the operation unit 155 by the mobile terminal 150 upon receiving the notification that the user authentication has succeeded, according to the first embodiment.

Here, the user is notified that a communication connection has been established with the target device (the multi-function peripheral 1000, in this case) and that a printing function for sending data to the multi-function peripheral and printing the data, a function for sending and saving data, or the like can be used.

In this manner, according to the first embodiment, a user of a mobile terminal can be authenticated over wireless communication from the mobile terminal even in a state where there is already a user logged into the multi-function peripheral through the console unit thereof. When the user of the mobile terminal is successfully authenticated, the display in the console unit does not switch in the case where there is already a user logged into the multi-function peripheral. As a result, the user of the mobile terminal can use the functions of the multi-function peripheral without interrupting operations being made by the user who is already logged in.

In the first embodiment, the user authentication settings from the mobile terminal are assumed to be set by the administrator of the multi-function peripheral through the console unit 110. However, it is also possible for the administrator of the multi-function peripheral to make the settings only in the case of disenabling user authentication settings from the mobile terminal, but otherwise normally have the multi-function peripheral enable user authentication settings from the mobile terminal.

Second Embodiment

A second embodiment of the present invention will be described next. In the above-described first embodiment, when the multi-function peripheral receives an authentication request from a mobile terminal over Bluetooth communication through a user authentication function, the multi-function peripheral controls whether or not to switch the login screen in the console unit on the basis of whether or not there is a user who has logged in through the console unit of the multi-function peripheral itself. Here, the determination as to whether to switch the screen may be controlled by the mobile terminal rather than the multi-function peripheral. Accordingly, unlike the first embodiment, the second embodiment will describe an example in which the mobile terminal 150 controls the screen in the console unit 110 of the multi-function peripheral 1000 to be switched. Note that the configurations of the multi-function peripheral 1000 and the mobile terminal 150 according to the second embodiment are the same as those in the above-described first embodiment and thus descriptions thereof will be omitted.

Here, an example in which the mobile terminal 150 makes an instruction to switch the display in the console unit 110 of the multi-function peripheral 1000 when authenticating a user for the multi-function peripheral through a Bluetooth communication function will be described with reference to FIGS. 7 and 8.

FIG. 7 depicts a view illustrating an example of a user authentication function setting screen displayed on the operation unit 155 by the mobile terminal 150 according to the second embodiment of the present invention.

This user authentication function setting screen includes an enable button 702 that enables a setting for requesting a screen displayed on the console unit 110 of the multi-function peripheral 1000 to be forcibly switched, and a disenable button 703 for disenabling the setting. When the enable button 702 is checked and an OK button 704 is touched, the mobile terminal 150 accepts a setting for requesting the screen displayed on the console unit 110 of the multi-function peripheral 1000 to be forcibly switched. On the other hand, when the disenable button 703 is checked and the OK button 704 is touched, the setting for requesting the screen displayed on the console unit of the multi-function peripheral 1000 to be forcibly switched is not made. A cancel button 705 is a button for canceling the settings through this screen and transiting to a different screen.

Note that in the second embodiment, these settings are input through the operation unit 155 of the mobile terminal 150 and the resulting setting values are held in the internal memory 153. FIG. 7 illustrates an example in which the setting for requesting the screen to be forcibly switched is enabled. The second embodiment assumes that this setting is made only by the administrator of the multi-function peripheral 1000.

FIG. 8 is a flowchart for describing the flow of a process performed when the mobile terminal 150 executes user authentication with the multi-function peripheral 1000 through Bluetooth communication, according to the second embodiment. Note that a program for executing this process is stored in the internal memory 153, and the process is implemented by the CPU 151 executing that program.

In step S801, the CPU 151 accepts an instruction to authenticate a user through Bluetooth communication from the operation unit 155 of the mobile terminal 150. FIG. 6A illustrates an example of the user authentication screen displayed on the operation unit 155 of the mobile terminal 150 at this time. The process then advances to step S802, where the CPU 151 obtains a user ID and password input through the screen illustrated in FIG. 6A. At this time, the user inputs the user ID and password through the operation unit 155, in the user ID input area 602 and the password input area 603 of the screen illustrated in FIG. 6A, and then touches an OK button 604. The user ID and password obtained here are held in the RAM 152. The process then advances to step S803, where, to request the user authentication, the CPU 151 sends the user ID and password to the multi-function peripheral 1000 through the wireless communication unit 158 using Bluetooth communication. The process then advances to step S804, where the CPU 151 stands by to receive a result of the user authentication from the multi-function peripheral 1000 through the wireless communication unit 158; the process advances to step S805 once the user authentication result is received. In step S805, the CPU 151 determines whether or not the user authentication has succeeded on the basis of the obtained user authentication result. Here, the process returns to step S801 in the case where the CPU 151 determines that the user authentication has failed.

In the case where the CPU 151 has determined in step S805 that the user authentication has succeeded, the process advances to step S806, where the success of the user authentication is displayed in the operation unit 155.

FIG. 6B depicts a view illustrating an example of the screen displayed in the operation unit 155 at this time.

The process then advances to step S807, where the CPU 151 obtains, through the wireless communication unit 158, authentication information of the user authenticated through the console unit 110 of the multi-function peripheral 1000. In the second embodiment, the user authentication information obtained here is saved in the RAM 152 of the mobile terminal 150. The process then advances to step S808, where the CPU 151 determines whether or not a user is already logged into the multi-function peripheral 1000 on the basis of the user authentication information obtained in step S807. In the case where the CPU 151 determines in step S808 that no user is currently logged into the multi-function peripheral 1000, the process advances to step S814. In step S814, the CPU 151 makes a request to the multi-function peripheral 1000 to change the display of the console unit 110 for the user authenticated through Bluetooth communication, and ends the process.

On the other hand, in the case where the CPU 151 determines in step S808 that a user is currently logged into the multi-function peripheral 1000, the process advances to step S809, where the CPU 151 obtains a forcible screen switch setting which has been set through the screen illustrated in FIG. 7 and saved in the internal memory 153. The process then advances to step S810, where the CPU 151 determines whether or not that setting is set to enable a forcible screen switch. The process ends in the case where this setting is disenabled, but the process advances to step S811 in the case where this setting is enabled. In step S811, the CPU 151 obtains the user authentication information obtained in step S807 and the user information authenticated through Bluetooth communication from the RAM 152, and compares them. The process advances to step S812, where the CPU 151 determines whether or not the two match. In the case where it is determined in step S812 that the two pieces of authentication information do not match, the process advances to step S813, where the CPU 151 sends a forcible switching request to the multi-function peripheral 1000 through the wireless communication unit 158 and ends the process. Upon the multi-function peripheral 1000 receiving this forcible switching request, the CPU 104 of the multi-function peripheral 1000 logs out the currently logged-in user and causes the display on the console unit 110 to change for the user authenticated through Bluetooth communication. On the other hand, in the case where the two pieces of authentication information match in step S812, there is no need to change the display in the console unit 110, and thus the CPU 151 ends the process.

According to the second embodiment as described thus far, even in the case where a user authenticated through the console unit of the multi-function peripheral is already logged in, a user can be authenticated from a mobile terminal in response to an instruction from the mobile terminal, without switching the display on the console unit of the multi-function peripheral. Accordingly, even in the case where a user authenticated through the console unit of the multi-function peripheral is currently logged in, the user of the mobile terminal can carry out user authentication and use the functions of the multi-function peripheral. In addition, a user of the mobile terminal is able to control whether or not to switch a display on the console unit of the multi-function peripheral after the user has been authenticated by the multi-function peripheral when a user authenticated through the console unit of the multi-function peripheral is currently logged in.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-213325, filed Oct. 29, 2015, which is hereby incorporated by reference herein in its entirety.

The invention claimed is:

1. An information processing apparatus comprising:
   a user interface including a touch panel that displays a screen and accepts user touch operations via the screen displayed on the touch panel;
   a Bluetooth® wireless communication interface that performs a wireless communication of the Bluetooth® with a communication terminal;
   a memory device that stores a program; and
   at least one processor that implements the program stored in the memory device to execute a plurality of tasks, including:
      an authentication control task that performs an authentication process to authenticate a user of the communication terminal based on user information received from the communication terminal via the Bluetooth® wireless communication interface; and
      a determination task that determines whether or not a login that enables to operate the information processing apparatus via the touch panel is currently on; and
      a control task that automatically causes, after the authentication successfully authenticates the user of the communication terminal based on the user information received from the communication terminal via the Bluetooth® wireless communication interface and the login that enables to operate the information processing apparatus via the touch panel is determined to be currently on, display, on the touch panel, information in order for the user to operate the information processing apparatus via the touch panel and to enable the information processing apparatus to operate based on a touch operation to the touch panel displaying the information by the user.

2. The information processing apparatus according to claim 1, wherein:
   the plurality of tasks include a setting task that sets whether or not to accept a user authentication request from the Bluetooth® wireless communication terminal, and
   the authentication control task accepts the user authentication request from the Bluetooth® wireless communication terminal through the communication interface in a case where the setting task has set to accept the user authentication request.

3. The information processing apparatus according to claim 2, wherein the user authentication request includes identification information and a password of a user.

4. The information processing apparatus according to claim 1, wherein the information processing apparatus is an image processing apparatus having a printing device and a scanner device.

5. A non-transitory computer-readable storage medium storing a program implemented by a computer to execute a method of controlling a printing apparatus including a touch panel that displays information and touchable by a user based on the information displayed on the touch panel, and a Bluetooth® wireless communication module that performs a wireless communication of the Bluetooth® with an external apparatus, the method comprising:
   performing an authentication process to authenticate a user of the external apparatus based on user information received from the external apparatus via the Bluetooth® wireless communication module;
   determining whether or not a login that enables to operate the printing apparatus via the touch panel is currently on; and
   after the authentication process successfully authenticates the user of the external apparatus based on the user information received from the external apparatus via the Bluetooth® wireless communication module and the login that enables to operate the printing apparatus via the touch panel is determined to be currently on, displaying, on the touch panel, information in order for the user to operate the printing apparatus via the touch panel and to enable the printing apparatus to operate based on a touch operation to the touch panel displaying the information by the user.

6. The information processing apparatus according to claim 2, wherein the control task causes, without requiring any user operations after the user authentication request is wirelessly received by the Bluetooth® wireless communication interface, the user interface to display an operation screen used for operating the information processing apparatus on the touch panel of the user interface.

7. The information processing apparatus according to claim 2, wherein the control task automatically causes, after the user has been authenticated based on the wirelessly received user authentication request, the user interface to display an operation screen used for operating the information processing apparatus on the touch panel of the user interface, in a case where the determination task determines that the login is currently on.

8. The information processing apparatus according to claim 2, wherein the control task does not automatically cause, after the user has been authenticated based on the wirelessly received user authentication request, the user interface to display an operation screen used for operating the information processing apparatus on the touch panel of the user interface, in a case where the determination tasks determines that the login is not currently on.

9. The information processing apparatus according to claim 2, wherein the control task enables the communication terminal to cause the information processing apparatus to perform a function without displaying an operation screen used for operating the information processing apparatus on the touch panel of the user interface, in a case where the determination task determines that the login is not currently on.

10. A printing apparatus comprising:
    a touch panel that displays information and touchable by a user based on the information displayed on the touch panel;
    a Bluetooth® wireless communication module that performs a wireless communication of the Bluetooth® with an external apparatus;
    a controller configured to perform a process based on information received from the external apparatus via the Bluetooth® wireless communication module, and to control a content displayed on the touch panel,
    wherein the controller is configured to:
        cause an authentication process to authenticate a user of the external apparatus based on user information received from the external apparatus via the Bluetooth® wireless communication module;
        determine whether or not a login that enables to operate the printing apparatus via the touch panel is currently on;
        after the authentication process successfully authenticates the user of the external apparatus based on the user information received from the external apparatus via the Bluetooth® wireless communication module and the login that enables to operate the printing apparatus via the touch panel is determined to be currently on, display, on the touch panel, information in order for the user to operate the printing apparatus via the touch panel and to enable the printing apparatus to operate based on a touch operation to the touch panel displaying the information by the user.

11. A method of controlling a printing apparatus including a touch panel that displays information and touchable by a user based on the information displayed on the touch panel, and a Bluetooth® wireless communication module that performs a wireless communication of the Bluetooth® with an external apparatus, the method comprising:
    performing an authentication process to authenticate a user of the external apparatus based on user information received from the external apparatus via the Bluetooth® wireless communication module;
    determining whether or not a login that enables to operate the printing apparatus via the touch panel is currently on; and
    after the authentication process successfully authenticates the user of the external apparatus based on the user information received from the external apparatus via the Bluetooth® wireless communication module and the login that enables to operate the printing apparatus via the touch panel is determined to be currently on, displaying, on the touch panel, information in order for the user to operate the printing apparatus via the touch panel and to enable the printing apparatus to operate based on a touch operation to the touch panel displaying the information by the user.

12. The non-transitory computer-readable storage medium according to claim 5, the method further comprising:
    determining, in a case where the authentication process has succeeded, whether or not another login user to the printing apparatus is using the touch panel; and
    transmitting the request for switching the information to be displayed on the touch panel, in a case where the determining determines that no another login user is using the touch panel of the printing apparatus.

* * * * *